(12) United States Patent
Enderle

(10) Patent No.: US 10,704,338 B2
(45) Date of Patent: Jul. 7, 2020

(54) ABUTMENTS FOR THREADED CONNECTIONS

(71) Applicant: Hydril Company, Houston, TX (US)

(72) Inventor: Doug R. Enderle, Humble, TX (US)

(73) Assignee: Hydril Company, Houston, TX (US)

( * ) Notice: Subject to any disclaimer, the term of this patent is extended or adjusted under 35 U.S.C. 154(b) by 0 days.

(21) Appl. No.: 16/052,553

(22) Filed: Aug. 1, 2018

(65) Prior Publication Data

US 2018/0340378 A1    Nov. 29, 2018

Related U.S. Application Data

(62) Division of application No. 12/186,603, filed on Aug. 6, 2008, now abandoned.

(60) Provisional application No. 60/954,277, filed on Aug. 6, 2007.

(51) Int. Cl.
*E21B 17/042* (2006.01)
*F16L 15/00* (2006.01)
*F16L 15/06* (2006.01)

(52) U.S. Cl.
CPC ........ *E21B 17/0426* (2013.01); *F16L 15/001* (2013.01); *F16L 15/06* (2013.01)

(58) Field of Classification Search
CPC .................................................. E21B 17/0426
USPC .......................... 285/333, 334; 403/496, 343
See application file for complete search history.

(56) References Cited

U.S. PATENT DOCUMENTS

| | | | | |
|---|---|---|---|---|
| 4,095,749 A | * | 6/1978 | Campbell | B05B 1/12 239/458 |
| 4,662,659 A | * | 5/1987 | Blose | E21B 17/0423 285/334 |
| 4,707,001 A | * | 11/1987 | Johnson | E21B 17/042 285/332.3 |
| 5,906,398 A | * | 5/1999 | Larsen | F16L 47/16 285/24 |
| 7,328,904 B2 | * | 2/2008 | Schell | B23B 31/1253 279/60 |
| 2006/0145476 A1 | * | 7/2006 | Reynolds, Jr. | E21B 17/0423 285/333 |
| 2006/0220382 A1 | * | 10/2006 | Reynolds, Jr. | E21B 17/0423 285/333 |
| 2014/0178126 A1 | * | 6/2014 | Burns | F16B 7/182 403/343 |

* cited by examiner

*Primary Examiner* — Joshua T Kennedy
(74) *Attorney, Agent, or Firm* — Osha Liang LLP

(57) ABSTRACT

A threaded connection includes a pin member having an external wedge thread increasing in width in a first direction, a box member having an internal wedge thread increasing in width in a second direction so that complementary internal and external wedge threads move into engagement upon make-up of the connection, a box thread stop at an end of the internal wedge thread of the box member, and a pin thread stop at an end of the external wedge thread of the pin member, wherein the pin and box thread stops are configured to contact when the connection is fully engaged.

9 Claims, 6 Drawing Sheets

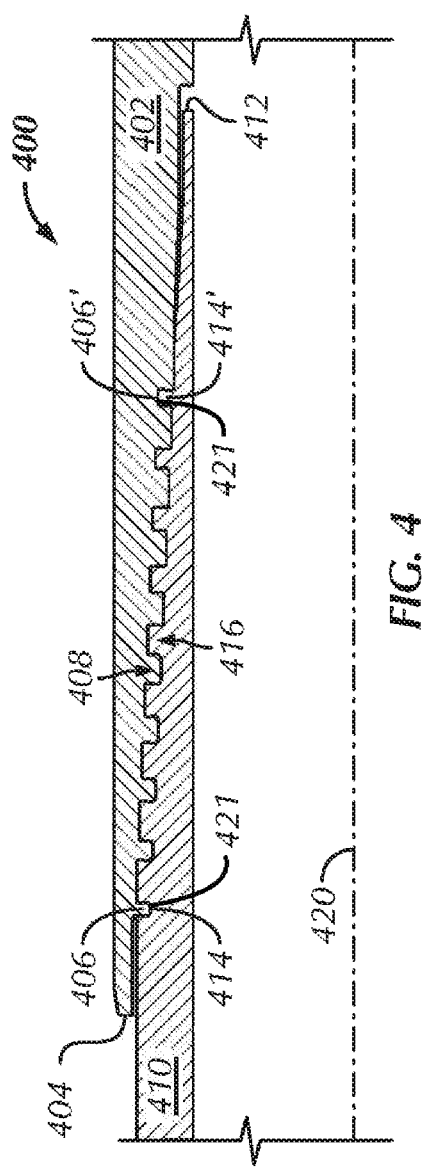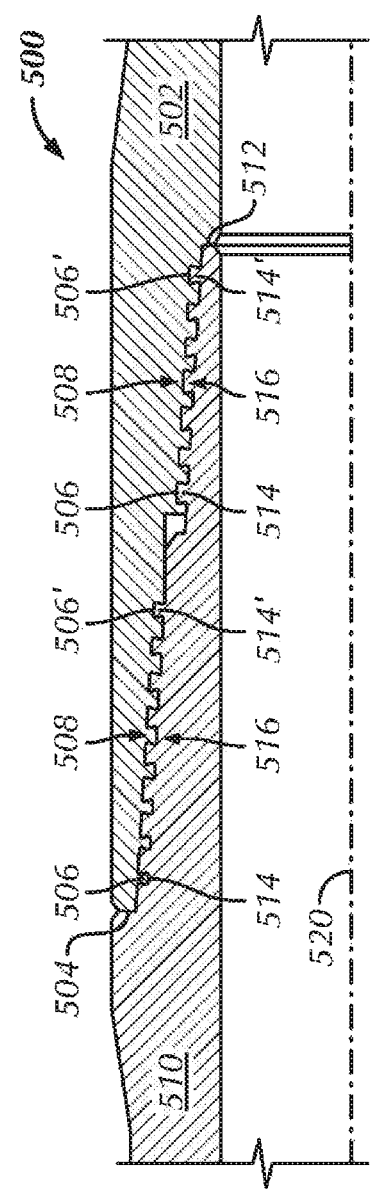

ABUTMENTS FOR THREADED CONNECTIONS

CROSS-REFERENCE TO RELATED APPLICATIONS

This application is a divisional filed pursuant to 35 U.S.C. § 121 of U.S. patent application Ser. No. 12/186,603 filed on Aug. 6, 2008, which is herein incorporated by reference in its entirety. U.S. patent application Ser. No. 12/186,603 claims priority to U.S. Provisional Application 60/954,277.

BACKGROUND OF DISCLOSURE

Field of the Disclosure

Embodiments of the present disclosure generally relate to methods to manufacture complex thread forms. Additionally, embodiments of the present disclosure relate to methods of manufacturing thread forms through milling. Further, selected embodiments of the present disclosure relate to methods of manufacturing thread forms with a thread stop.

Background Art

Casing joints, liners, and other oilfield tubulars are frequently used to drill, complete, and produce wells. For example, casing joints may be placed in a wellbore to stabilize and protect a formation against high wellbore pressures (e.g., wellbore pressures that exceed a formation pressure) that could otherwise damage the formation. Casing joints are sections of pipe (e.g., steel or titanium), which may be coupled in an end-to-end manner by threaded connections, welded connections, or any other connection mechanisms known in the art. As such, connections are usually designed so that at least one seal is formed between an interior of the coupled casing joints and the annulus formed between exterior walls of the casing joints and the interior walls of the wellbore (i.e., the formation). The seals may be elastomeric (e.g., an o-ring seal), thread seals, metal-to-metal seals, or any other seals known to one of ordinary skill in the art.

It should be understood that certain terms are used herein as they would be conventionally understood, particularly where threaded tubular joints are connected in a vertical position along their central axes such as when making up a pipe string for lowering into a well bore. Typically, in a male-female threaded tubular connection, the male component of the connection is referred to as a "pin" member and the female component is called a "box" member. As used herein, "make-up" refers to engaging a pin member into a box member and threading the members together through torque and rotation.

Further, the term "selected make-up" refers to the threading of a pin member and a box member together with a desired amount of torque or based on a relative position (axial or circumferential) of the pin member with respect to the box member. Furthermore, the term "box face" is understood to be the end of the box member facing outward from the box threads and the term "pin nose" is understood to be the end of the pin member facing outward from the threads of the connection. As such, during selected make-up of a connection, the nose of the pin is stabbed or inserted into and past the face of the box.

Referring to the geometry of threads, the term "load flank" designates the side wall surface of a thread that faces away from the outer end of the respective pin or box member on which the thread is formed and supports the weight (i.e., tensile load) of the lower tubular member hanging in the well bore. Similarly, the term "stab flank" designates the side wall surface of the thread that faces toward the outer end of the respective pin or box member and supports forces compressing the joints toward each other such as the weight of the upper tubular member during the initial make-up of the joint or such as a force applied to push a lower tubular member against the bottom of a bore hole (i.e., compressive force).

One type of threaded connection commonly used in conjunction with oil country tubular goods is a wedge thread. Referring initially to FIGS. 1A and 1B, a prior art tubular connection 100 having a wedge thread is shown. As used herein, "wedge threads" are threads, regardless of a particular thread form, that increase in width (i.e., axial distance between load flanks 125 and 126 and stab flanks 132 and 131) in opposite directions on a pin member 101 and a box member 102. The rate at which the threads change in width along the connection is defined by a variable known as a "wedge ratio."

As used herein, "wedge ratio," although technically not a ratio, refers to the difference between the stab flank lead and the load flank lead, and describes how the opposing surfaces come together with every revolution of the thread. Furthermore, as used herein, a thread "lead" refers to the differential distance between a component of a thread on consecutive threads. As such, the "stab lead" is the distance between stab flanks of consecutive thread pitches along the axial length of the connection. The variance in thread width for a wedge thread occurs as a result of the load flanks having different leads than the stab flanks. A thread lead may be quantified in inches per revolution. Note that this is the inverse of a commonly used term "thread pitch," which is commonly quantified as threads per inch. A detailed discussion of wedge ratios is provided in U.S. Pat. No. 6,206,436, issued to Mallis, assigned to the assignee of the present invention, and incorporated by reference in its entirety herein. Furthermore, wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present application, and incorporated herein by reference in their entirety.

Referring still to FIGS. 1A and 1B, a pin thread crest 122 in a wedge thread connection is narrow towards a distal end 108 of pin member 101 while a box thread crest 191 is wide. Moving along an axis 105 (from right to left), pin thread crest 122 widens while box thread crest 191 narrows as it approaches a distal end 110 of box member 102. As shown in FIG. 1A, the threads are tapered, meaning that a pin thread 106 increases in diameter from beginning to end while a box thread 107 decreases in diameter in a complimentary manner. Having a thread taper may improve the ability to stab pin member 101 into box member 102 and distribute stress throughout the connection. One example of a suitable thread form is a semi-dovetailed thread form disclosed in U.S. Pat. No. 5,360,239, issued to Klementich, and incorporated herein by reference in its entirety.

Furthermore, as shown, connection 100 includes a metal-to-metal seal 112 created by contact between corresponding seal surfaces 103 and 104, respectively located on pin member 101 and box member 102. Metal-to-metal seal 112 provides an additional measure of seal integrity (i.e., when a wedge thread seal is not sufficient) for threaded connection 100, and is particularly useful where connection 100 is intended to contain high-pressure gases. While the metalto-metal seal is shown located proximate to the distal end 108 of pin member 102, it should be understood by one of ordinary skill in the art that metal-to-metal seal 112 may be positioned anywhere along the length of connection 100, including, but not limited to, a location proximate to the distal end of box member 102.

Nonetheless, seal surfaces 103 and 104 of metal-to-metal seal 112 are usually constructed as corresponding frusto-conical surfaces characterized by a low seal angle (e.g., an angle less than about 4 or 5 degrees) with their corresponding remaining pin 101 and box 102 surfaces. Typically, low-angle metal-to-metal seal surfaces 103 and 104 are used in conjunction with wedge thread connections (e.g., 100) because the indeterminate make-up thereof necessitates a seal capable of less precise axial alignment. As wedge threads make-up indeterminately, the relative axial position of pin member 101 and box member 102 will vary over successive make-up and breakout cycles. Furthermore, as low-angle frusto-conical metal-to-metal seals engage slowly (i.e., low radial displacement per revolution), the seals are typically in contact for several revolutions. As such, in a wedge thread connection including a metal-to-metal seal, the seal is typically the first thing to "make-up," such that the initial engagement of the seal marks the "hand tight" state of such a threaded connection. Therefore, while low-angle seals are beneficial in that they accommodate the indeterminate make-up characteristics of wedge threads, they may become ineffective over repeated make-up and break-out cycles as seal surfaces 103 and 104 are deformed and/or are cold-worked out of specification.

Referring still to FIGS. 1A and 1B, in wedge threads, a thread seal may be accomplished through contact pressure caused by interference that occurs at make-up over at least a portion of connection 100 between pin load flank 126 and box load flank 125 and between pin stab flank 132 and box stab flank 131. Close proximity or interference between roots 192 and 121 and crests 122 and 191 complete the thread seal when occurring proximate to such flank interference. Generally, higher pressures may be contained by increasing interference between the roots and crests ("root/crest interference") on pin member 101 and box member 102 and/or by increasing the aforementioned flank interference.

Although various wedge thread connections exist having positive-stop torque shoulders (e.g., Klementich, referenced above), wedge threads typically do not have positive-stop torque shoulders, so their make-up is "indeterminate." As a result, the relative position of the pin member and box member may vary more during selected make-up for a given torque range to be applied than for connections having a positive-stop torque shoulder. For wedge threads designed to have flank interference and root/crest interference at a selected make-up, the connection is designed such that both the flank interference and root/crest interference increase as the connection is made-up (i.e., an increase in torque increases flank interference and root/crest interference). For tapered wedge threads having root/crest clearance, the clearance decreases as the connection is made-up.

Regardless of the design of the wedge thread, corresponding flanks come closer to each other (i.e., clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the selected make-up torque on the connection. However, increased interference and make-up torque may increase stress on the connection during selected make-up, which may lead to premature failure of the connection.

A two-step wedge thread connection is disclosed in U.S. Pat. No. 6,206,436, issued to Mallis, and hereby incorporated by reference herein. Mallis discloses a two-step wedge thread connection having different wedge ratios, one of which is considered to be an aggressive wedge ratio and the other a conservative wedge ratio, wherein "aggressive" refers to a larger wedge ratio, and "conservative" refers to a smaller wedge ratio. With all other thread characteristics held constant, a greater wedge ratio will exhibit a more determinate make-up. However, too large of a wedge ratio may have an inadequate wedging effect, which may allow the connection to back off during use. Conversely, smaller wedge ratios are better able to resist backing-off of the connection, but may have such an indeterminate make-up that galling may occur over the lengthened make-up distance. Mallis discloses that one of the steps in a multi-step thread may have a wedge ratio optimized for a more determinate make-up (aggressive), while another step may have a wedge ratio optimized to prevent backing-off of the connection (conservative).

As previously mentioned, wedge threads typically do not include positive-stop torque shoulders because positive-stop torque shoulders reduce the amount of pipe thickness available for threads. Instead, the threads rely on a "wedge effect," or the wedge threads engaging stab and load flanks and allowing the wedge ratio to act as a "torque shoulder." Difficulties may still remain with wedge thread connections, however, since relative final positions of the box and pin members upon completion of a selected make-up of the wedge threads may vary from one make-up to another. This can cause a variation of contact stresses of the non-threaded features of the connection, i.e., the seals. Failure of seals may lead to a premature failure of the threaded connection.

Furthermore, problems may arise in a threaded connection from over-torquing during downhole rotation, or even as a result of repetitive make-up and break-out cycles over the life of the connection. FIG. 2A shows a pipe end with a typical thread 200 that has a thread pull-out 210 at an end of the thread helix 220. A thread pull-out 210 is a transition from the thread root to the thread crest at which the thread form "runs" out. FIG. 2B shows a section view of thread pull-out 210 for thread 200. Thread pull-out 210 transitions by way of an inclined surface 212 from a thread root 214 to a crest 216 of thread 200. During selected make-up of the connection, when subjected to high torque, a thread start of one member (i.e., the pin) may slide up the surface of a thread pull-out of the other member (the box), leading to a radial separation of the threads. This failure may comprise the integrity of the entire threaded connection and may lead to premature failure as well.

Improvements made to the threaded connections to improve predictability and accuracy of locating a fully engaged make-up position would be well received in the industry. Furthermore, improvements made to threaded connections to prevent or reduce variations in contact stresses and radial separation of the threads of premium threaded oilfield country tubular goods would be well received in the industry. Particularly, for wedge thread forms, methods and apparatus to locate a fully engaged position, prevent radial separation, and provide additional anti-torque features are highly desirable.

SUMMARY OF INVENTION

In one aspect, embodiments disclosed herein relate to a threaded connection including a pin member having an external wedge thread increasing in width in a first direction and a box member having an internal wedge thread increasing in width in a second direction so that complementary internal and external wedge threads move into engagement upon make-up of the connection. The threaded connection further includes a box thread stop at an end of the internal wedge thread of the box member and a pin thread stop at an end of the external wedge thread of the pin member. The pin and box thread stops are configured to contact when the connection is fully engaged.

In another aspect, embodiments disclosed herein relate to a method to machine a threaded connection on a workpiece including rotating a milling cutter about a central axis of a pin member, wherein a pin thread stop is machined at an end of an external wedge thread. The method further includes rotating a milling cutter about a central axis of a box member, wherein a box thread stop is machined at an end of an internal wedge thread.

In another aspect, embodiments disclosed herein relate to a method to make-up a wedge-threaded connection including rotationally engaging a pin wedge thread with a box wedge thread, making up stab flanks, a metal seal, load flanks, roots, and crests of the wedge-threaded connection and fully engaging the pin wedge thread with the box wedge thread by making up a pin stop with a box stop.

In another aspect, embodiments disclosed herein relate to a threaded connection including a pin member having an external thread and a box member having an internal thread so that complementary internal and external threads move into engagement upon selected make-up of the connection. The threaded connection also includes a box thread stop at an end of the internal thread of the box member and a pin thread stop at and end of the external thread of the pin member, wherein the pin and box thread stops are configured to contact when the connection is fully engaged.

Other aspects and advantages will be apparent from the following description and the appended claims.

BRIEF DESCRIPTION OF DRAWINGS

FIG. 4 is a section view of a wedge thread connection in accordance with embodiments of the present disclosure.

FIG. 5 is a section view of a two-step wedge thread connection in accordance with embodiments of the present disclosure.

DETAILED DESCRIPTION

Embodiments of the present disclosure generally relate to complex threads and methods of manufacturing complex threads. Further, selected embodiments of the present disclosure relate to thread forms with a thread stop and methods of manufacturing thread forms with a thread stop.

Thread Form Features

Figure 3:
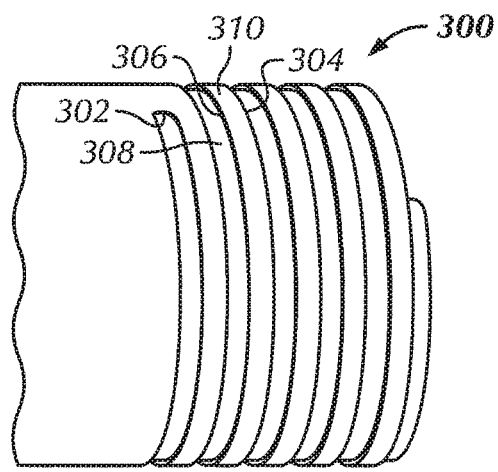
FIG. 3 is a component view of a pipe end with a thread stop in accordance with embodiments of the present disclosure.

Referring to FIG. 3, a component view of a pin member having a helical thread form 300 with a thread stop 302 is shown in accordance with embodiments of the present disclosure. Thread form 300 comprises a stab flank 304, a load flank 306, a thread root 308, and a thread crest 310. Thread form further comprises thread stop 302 positioned at the end of a helix of thread form 300. It is understood that although a generic thread form is shown in FIG. 3, thread stop 302 may be used with any thread forms used in threaded connections, including free-running, wedge threads, or other thread types known to one of ordinary skill in the art. Furthermore, those having ordinary skill in the art should appreciate that thread stop 302 located at the back of the pin thread groove (as shown in FIG. 3) may have a corresponding truncated thread near the face of a corresponding box member.

Referring now to FIG. 4, a section view of a threaded connection 400 is shown in accordance with embodiments of the present disclosure. Threaded connection 400 comprises a box member 402 and a pin member 410 which revolve about center axis 420. Box member 402 has a tapered, internal, generally dovetail-shaped thread structure formed thereon and adapted for engaging complementary tapered, external, generally dovetail-shaped thread structure formed on pin member 410 to mechanically secure the box and pin members in a releasable manner.

Internal thread of box member 402 has stab flanks, load flanks, roots, crests, and a box thread stop. The thread increases in width progressively at a uniform rate in one direction substantially the entire helical length of thread. External thread of pin member 410 has stab flanks, load flanks, roots, crests, and a pin thread stop. The thread increases in width progressively at a uniform rate in the other direction substantially the entire helical length of thread. The interaction of the load flanks, the taper of the threads, and the relative thread heights cause the complementary roots and crests of the respective threads to move into engagement during selected make-up of the connection. Root and crest engagement is followed by the moving of complementary stab and load flanks into engagement upon selected make-up of the connection. The moving of complementary flanks, roots and crests into engagement forms sealing surfaces that resist the flow of fluids between the threads. Engagement of the box thread stop and the pin thread stop is the last to occur in the selected makeup process of the threaded connection. Thread stop engagement may signify the threaded connection is fully engaged and should progress no further.

The pin thread stop and the box thread stop may be configured as corresponding surfaces which engage on or near completion of the selected makeup of the threaded connection. Further, thread stops may comprise male and female configurations, i.e., there may be a female pin thread stop in contact with a male box thread stop. There may further be a male pin thread stop in contact with a female box thread stop. As such, the thread stops may be the last features of the threaded connection to engage, therefore their respective locations are specific to which member (pin or box) they are on.

FIG. 4 shows one example of locations for a female pin thread stop 414 and a male box thread stop 406. As shown, male box thread stop 406 may be located at a beginning of the internal thread form 408 of box member 402. As such, male box thread stop 406 may be created by truncating internal thread form 408 of box member 402 and forming an abutment at the start of the thread helix proximate the box face 404 of box member 402. Furthermore, a corresponding female pin thread stop 414 may be located at a pin thread pull-out and may be created by truncating external thread form 416 of pin member 410 and forming an abutment at the end of the thread helix distal a pin nose 412 of pin member 410.

Alternatively, in accordance with the present disclosure, a female box thread stop 406' may be located at a box thread pull-out in internal thread form 408 of box member 402. Such a female box thread stop 406' may be created by truncating the internal thread form 408 of box member 402 and forming an abutment at the end of the thread helix distal the box face 404 of box member 402. Similarly, a corresponding male pin thread stop 414' may be located at a pin thread start and may be created by truncating the external thread form 416 of pin member 410 and aiming an abutment at the start of the thread helix proximate to pin nose 412 of pin member 410.

Referring now to FIG. 5, a section view of a two-step threaded connection 500 is shown in accordance with embodiments of the present disclosure. Threaded connection 500 includes a box member 502 and a pin member 510 positioned about a center axis 520. Box member 502 has two thread steps each having a tapered, internal, generally dovetail-shaped thread structure formed thereon and adapted for engaging complementary tapered, external, generally dovetail-shaped thread structure formed on the two thread steps of pin member 510 to mechanically secure the box and pin members in a releasable manner.

Internal thread on each step of box member 502 has stab flanks, load flanks, roots, crests, and box thread stops. The thread increases in width progressively at a uniform rate in one direction substantially the entire helical length of thread. External thread on each step of pin member 510 has stab flanks, load flanks, roots, crests, and pin thread stops. The thread increases in width progressively at a uniform rate in the other direction substantially the entire helical length of thread. The interaction of the load flanks, the taper of the threads, and the relative thread heights cause the complementary roots and crests of the respective threads to move into engagement during selected make-up of the connection. Root and crest engagement is followed by the moving of complementary stab and load flanks into engagement during selected make-up of the connection. The moving of complementary flanks, roots and crests into engagement forms sealing surfaces that resist the flow of fluids between the threads. Engagement of the box thread stops and the pin thread stops is the last to occur in the makeup process of the threaded connection. Thread stop engagement may signify the threaded connection is fully engaged and should progress no further.

FIG. 5 shows the locations of female pin thread stops 514 and male box thread stops 506 on 2-step threaded connection 500. Male box thread stops 506 may be located at box thread starts in the internal thread forms 508 of box member 502, and may be created by truncating internal thread forms 508 of box member 502 and forming abutments at the starts of the thread helices proximate to a box face 504 of box member 502. Similarly, corresponding female pin thread stops 514 may be located at pin thread pull-outs and therefore may be configured by truncating the external thread forms 516 of pin member 510 and forming abutments at the ends of the thread helices distal a pin nose 512 of pin member 510.

Alternatively, in selected embodiments, female box thread stops 506' may be located at box thread pull-outs in the internal thread form 508 of box member 502, and may be created by truncating the internal thread forms 508 of box member 502 and forming abutments at the end of the thread helices distal the box face 504 of box member 502. Similarly, corresponding male pin thread stops 514' may be located at pin thread starts and may be created by truncating the external thread forms 516 of pin member 510, forming abutments at the starts of the thread helices proximal the pin nose 512 of pin member 510.

Figure 6A:
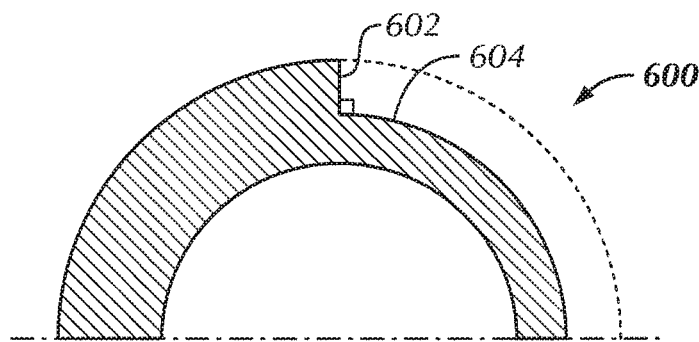
FIGS. 6A-6C are a section views of thread stop configurations in accordance with embodiments of the present disclosure.
Figure 6B:
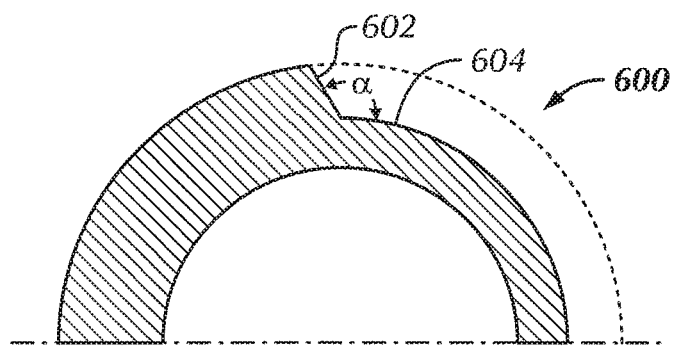
Figure 6C:
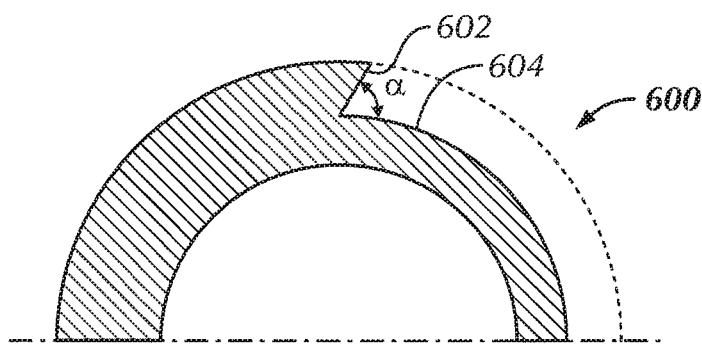

Referring now to FIG. 6, section views of the last thread of a box member internal thread form are shown in accordance with embodiments of the present disclosure. Furthermore, FIG. 6 shows varying configurations of a thread stop 600, namely a neutral, positive, and negative configuration in accordance with embodiments of the present disclosure. The configuration of thread stop 600 is defined by the box thread stop only, with the pin thread stop configured to correspond as needed. FIG. 6A is thread stop 600 comprising a surface 602 in a neutral configuration. The neutral configuration may be defined as thread stop 600 having surface 602 formed substantially perpendicular (90 degrees) to a thread root surface 604 (inner surface). FIG. 6B is a thread stop 600 comprising a surface 602 in a positive configuration. The positive configuration may be defined as thread stop 600 having surface 602 formed at an angle α greater than 90 degrees (or obtuse) with respect to a thread root surface 604. FIG. 6C is a thread stop 600 comprising a surface 602 in a negative configuration. The negative configuration may be defined as thread stop 600 having surface 602 formed at an angle α less than 90 degrees (or acute) to a thread root surface 604. It is understood that surface 602 of thread stop 600 may be flat, arcuate, or any other engagement configuration known to one of ordinary skill in the art.

Embodiments of the present disclosure may provide advantages in the selected make-up of the pin and box member threaded connections. In forming a connection between the pin and box members, the selected makeup sequence of the wedge threads may be altered to produce various sequences. In one configuration, the roots and crests of the threads may come into contact initially during makeup; then the stab and load flanks of the thread may come into contact; finally, the pin and box thread stops may be the last features to come into contact. In a second configuration, the stab and load flanks may come into contact initially during make-up; then the roots and crests may come into contact; finally the box and pin thread stops may contact. In both configurations, the pin and box thread stops may be the last features to contact in the selected make-up sequence. While only two selected make-up sequences are disclosed herein, it should be understood that various alternative selected make-up sequences may be known to persons having ordinary skill in the art.

Figure 7A:
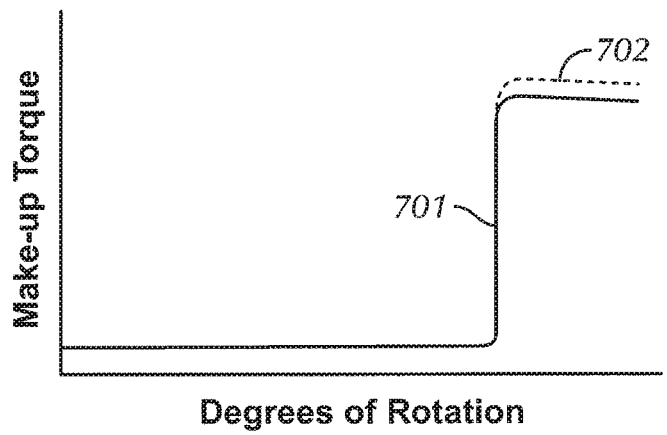
FIGS. 7A and 7B depict torque-turn curves for connections having free-running threads in accordance with embodiments of the present disclosure.

Referring now to FIG. 7A, torque-turn curves for the selected make-up of threaded connections having free-running threads (and including a positive-stop torque shoulder) both with and without a thread stop feature are shown in accordance with embodiments of the present disclosure. Free-running threaded connections are made-up until the positive-stop torque shoulder 701 is engaged, at which the torque-turn curve becomes almost vertical. Thread stops 702 may increase the torsional yield of the threads by providing an additional anti-torque feature along with the positive-stop torque stop. It should be noted that torque-turn curves (FIGS. 7A and 7B) are schematic representations and are exaggerated in some regions. Therefore they are for representative purposes only and are not drawn to any particular or relative scale.

Figure 7B:
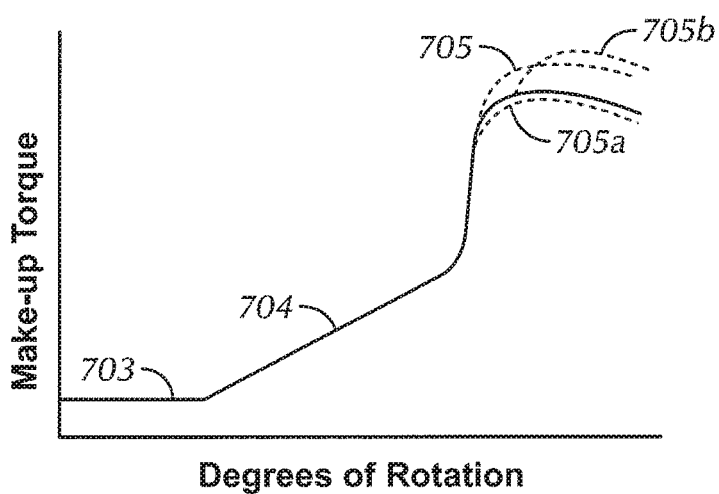

Referring now to FIG. 7B, torque-turn curves for the selected make-up of threaded connections having wedge threads both with and without a thread stop feature are shown in accordance with embodiments of the present disclosure. Relative engagement of the wedge threads (stab and load flanks) and the pin and box thread stops are timed such that the roots and crests, and stab and load flanks engage first, followed by the engagement of the pin and box thread stops. The thread stops may provide an indication of when a threaded connection is fully made-up. Wedge threads are typically made-up with root and crest engagement 703, followed by stab and load flank engagement 704. As previously mentioned, wedge thread connections may be considered "indeterminate" because of the relative positioning between the box and pin members. Advantageously, thread stops may allow for a more "determinate" make-up by providing indication of a fully engaged connection 705, shown on the torque-turn curve as a substantially vertical line. This indication of a fully engaged connection may help prevent over-tightening of the connection causing plastic deformation of the threads. Furthermore, the addition of thread stops may raise the torsional yield point of the threads, thus adding torque capacity as well as an extra torsional safety factor to the connection.

The moment at which contact occurs between the box thread stop and pin thread stop at selected make-up may be varied to occur at different times in the makeup sequence by adjusting the location (i.e., the "timing") of either thread stop. Referring still to FIG. 7, adjusting the location of one of the thread stops, either the pin thread stop or box thread stop, to a location "earlier" in the thread helix may produce an earlier engagement of the thread stops in the make-up sequence at selected make-up 705*a*. Further, adjusting the location of either thread stop to a location "later" in the thread helix may produce a later engagement of the thread stops in the make-up sequence at selected make-up 705*b*. Still further, adjustment of the location of the thread stops may increase the make-up torque 705*b*, or decrease the make-up torque 705*a*.

Further, upon selected make-up, the thread stops may be configured such that a small gap exists therebetween. Advantageously, this may allow for the thread stops to "protect" the connection in the event that the threaded connection is over-torqued, either during make-up or other downhole operations. In such a configuration, when the connection is over-torqued, the thread stops move into contact and can prevent additional relative rotational movement (and thread damage) of the threaded tubulars. The gap may provide a small "torque cushion" in the connection that may prevent the thread features from plastically deforming or failing by keeping the contact stresses between the thread stops below the yield limit of the material of the connection.

Furthermore, the timing of the contact between the box thread stop and pin thread stop may be critical upon selected make-up of the connection. For example, occurring too early in the sequence may result in a failure of the thread stops. In further embodiments of the present disclosure, a wedge-threaded connection may include a positive-stop torque shoulder in combination with a pin and box thread stop engagement. When used in combination with a standard positive-stop torque shoulder, the selected make-up may be "timed" so that the pin thread stop and box thread stop contact occurs only if the positive-stop torque shoulder has been elastically deformed by a predetermined amount. Upon selected make-up, it may be desirable to time the contact of the box thread stop and pin thread stop to occur just prior to plastic deformation of the threads. Alternatively, the pin thread stop and box thread stop may be timed to come into contact only if the positive-stop torque shoulder has plastically deformed, or after it has yielded. Still further, upon selected make-up, because of the relatively small areas of the thread stops as compared to the areas of the threads, the pin thread stop and box thread stop may be timed to engage only after another torque stop device, such as a positive-stop torque shoulder has engaged.

Alternate embodiments of the present disclosure may include the use of the pin thread stop and box thread stop in combination with a two-step wedge thread connection. The two-step wedge thread connection may have different wedge ratios (Mallis), one of which is considered to be an aggressive wedge ratio and the other a conservative wedge ratio. In alternate embodiments, thread stops may be included in the thread forms having the aggressive wedge ratio of the two-step connection. Including the thread stop feature in the wedge thread having an aggressive wedge ratio may be advantageous, since in two-step wedge thread connections, the aggressive wedge ratio is concerned with providing a more determinate make-up for the connection rather than preventing the connection from backing-off. Further, alternate embodiments of the present disclosure may include the use of the pin thread stop and box thread stop in combination with a two-step wedge thread connection having a high-angle metal-to-metal seal.

Alternatively, thread stop embodiments of the present disclosure may be useful in thread forms characterized by radial interference (e.g., buttress threads) to prevent radial separation of male and female members upon selected make-up. Particularly, properly located pin and box thread stops may prevent over-torquing a connection having interference between the roots and crests of corresponding members. Typically, as such threads are over torqued, the box exhibits radial hoop expansion (i.e., a box blow-out) while the pin may experience a Embodiments of the present disclosure may provide advantages to the sealing features of the threaded connections. Ideally, as a metal-to-metal seal is formed (e.g. a frusto-conical seal) the surfaces coming into contact rub for a short distance causing "burnishing" of the surfaces. As used herein, "burnishing" means a slight polishing or smoothing of the surfaces. If the surfaces contact for too great of a length at too great of a contact pressure, galling may occur. Galling occurs when the lubricant is displaced from between the surfaces as sliding contact continues, resulting in an increase in friction and heat build up. In contrast, to form a thread seal, contact pressure between mating surfaces (e.g. load flanks, stab flanks, and roots and crests) is typically from about 25 percent to about 100 percent of the yield strength of the material. Closed thread forms (e.g. dovetailed threads) generally allow for the contact pressure to be towards the higher end of the range. Ideally, a thread seal is formed by surfaces coming together over a short distance with sharply rising contact pressure ending with the contact pressure within the effect range of forming a thread seal. The pin and box thread stops, which effectively form a "positive" stop shoulder engagement, may prevent variations of the contact stresses of the seals of the threaded connection.

Figure 1A:
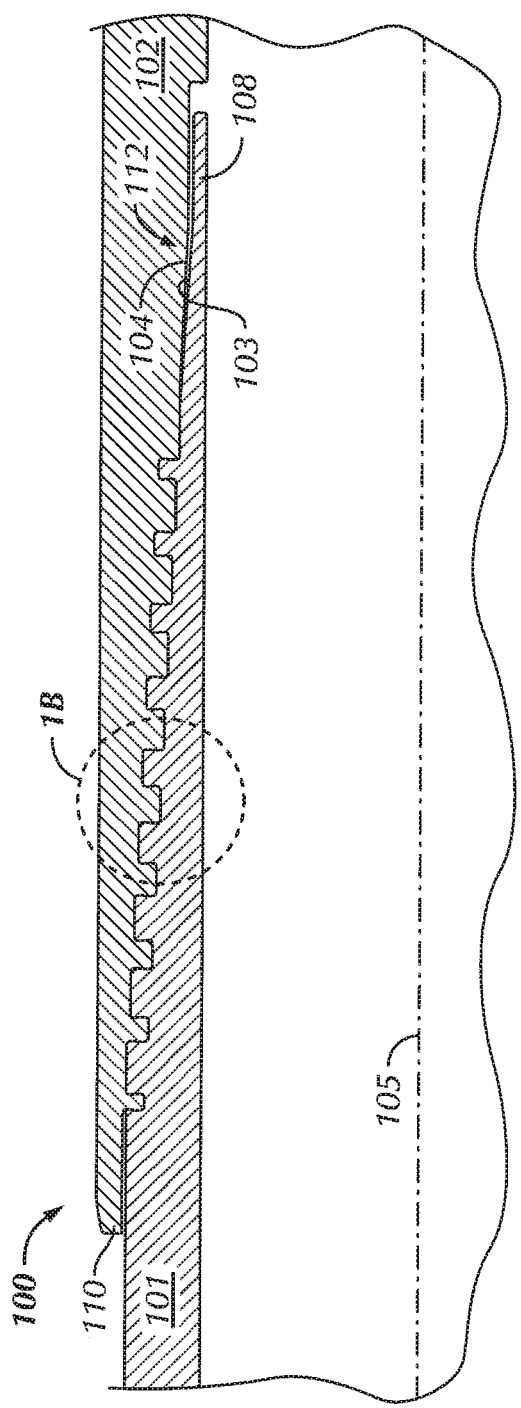
FIGS. 1A and 1B depict a cross-sectional view of a prior art wedge thread.
Figure 1B:
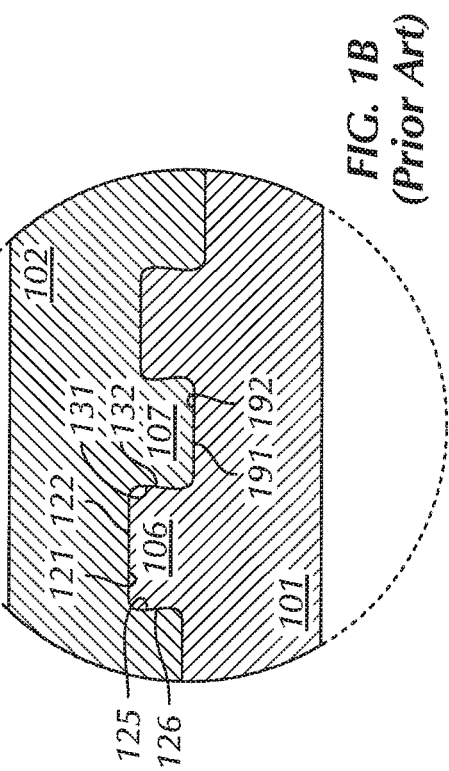

The addition of the pin and box thread stop features in a threaded connection alters the connection by providing a "determinate" make-up, much like the positive-stop torque shoulder previously mentioned. One of the reasons for having a positive-stop torque shoulder was that it allowed a steeper contact angle to be implemented on the metal-to-metal seal 112 of FIG. 1A. Eliminating the positive-stop torque shoulder requires the use of a shallow seal angle which is more difficult to maintain and increases the chance of galling the seal material in the contact area. The determinate make-up provided by the thread stop feature of embodiments of the present disclosure may permit a steep seal angle to be used in the threaded connection, which may further provide a more reliable threaded connection as repeated make-up and break-out cycles are performed.

Thread Form Machining

Figure 8:
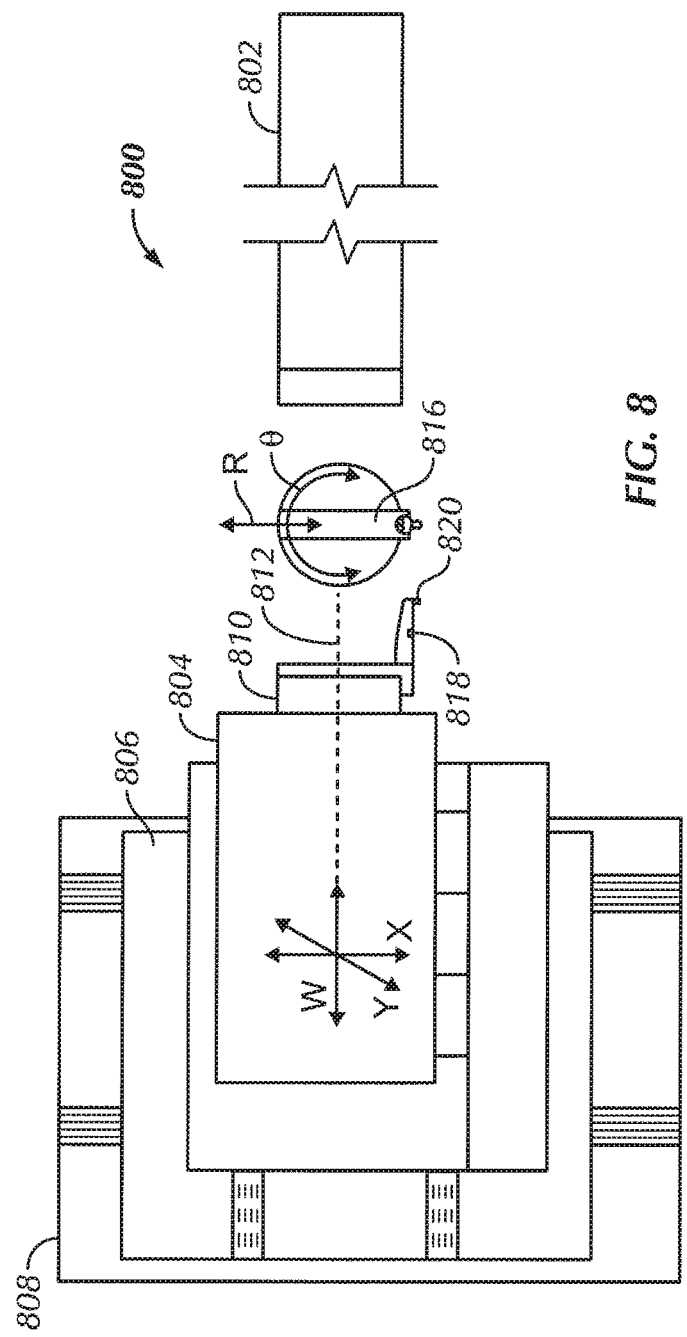
FIG. 8 is an assembly view of a thread machining apparatus.

Referring now to FIG. 8, a machining unit 800 is shown in relation to a tubular workpiece 802 to be machined. Particularly, machining unit 800 includes a base 804 that is mounted atop a three-axis (W, X, and Y) positioning unit including a pair of slide tables 806 and 808 such that a first slide table 806 traverses base 804 in the positive and negative W axis, and a second slide table 808 traverses base 804 in the positive and negative X axis. A height adjustable base (not visible) may adjust machining unit base 804 up and down (i.e., positive and negative) in the Y axis.

Next, machining base 804 includes a drive motor (not shown) configured to rotate a spindle 810 in a direction Ø about an axis 812 substantially parallel to axis W. Preferably, the drive motor is an electrical motor having a torque output sufficient to perform a machining operation on tubular workpiece 802, but may include any machine tool propulsion mechanism known to one of ordinary skill in the art. Further, spindle 810 includes a tool holder 816, to secure a milling head 818 at its distal end. As such, tool holder 816 is displaceable in positive and negative directions of an R axis to determine a radius of cut about axis 812 for milling cutter 820.

After workpiece 802 is "centered" with respect to machining body 804 and spindle 810, the X and Y axes may be locked during a thread machining operation to prevent displacements that may adversely affect machining tolerances of the thread machining operation. Nonetheless, it should be understood that for a complex machining task, the X and Y axes may be "unlocked" and varied to allow more complex geometries to be machined. Once machining body 804 and spindle 810 are centered with respect to a center axis of tubular workpiece 802, tool holder 816 is traversed across the R axis to set the radius of cut about axis 812. For internal threads, tool holder 816 is positioned such that milling head 818 is below and milling cutter 820 faces away from axis 812 (shown). In contrast, for machining external threads, tool holder 816 is traversed (without rotating spindle 810) such that milling head 818 is above and milling cutter 820 faces axis 812.

To machine threads on workpiece 802, a milling cutter 820 that is appropriate for the particular thread form is selected and rotated at a desired angular velocity, and milling head 818 is positioned such that the proper configuration (internal or external) and radius for threads is set. Next, a rate of rotation of spindle 810 about axis 812 and a rate of traversal of machining body 804 along the W axis (i.e., the feed rate) is selected for a particular thread form. It should be understood that the rate of rotation and the feed rate selected will determine the pitch of the thread while the position of milling head 818 with respect to axis 812 will determine the depth of cut. Further, it should be understood that in order to maximize tool life and the quality of the machined surfaces, several helical passes of milling cutter 820 about workpiece 802 may be necessary to complete the thread form.

Additionally, the geometry and speed of rotation for milling cutter 820 may make a difference in the number of passes required and the cutting rates possible to machine a thread form upon workpiece 802. As shown in FIG. 7, milling cutter 820 is positioned such that rotation axis 812 is substantially aligned with the center axis of tubular workpiece 802. In this position relative to workpiece 802, milling cutter 820 may make helical cuts that are tangential (i.e., perpendicular to the center axis) to the outer and inner surfaces of tubular workpieces 802.

Figure 2A:
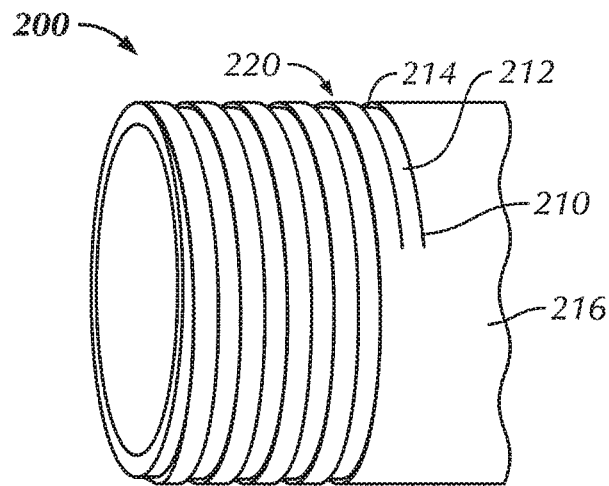
FIG. 2A is a component view of a pipe end with a prior art thread run-out.
Figure 2B:
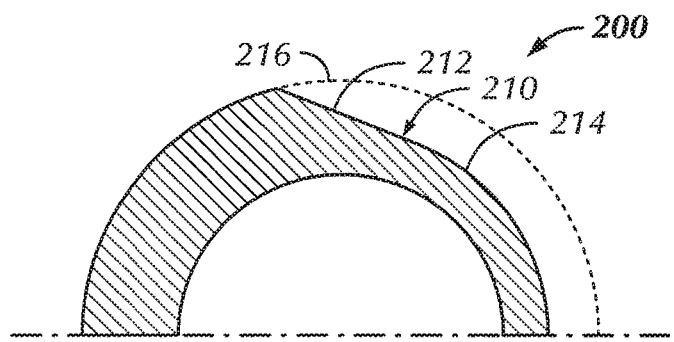
FIG. 2B is a section view of prior art thread run-out.

Referring back to FIGS. 2A and 2B, views of a thread form where a cutter is "run-out" of the thread form are shown. As the cutter nears the end of the thread form helix, it must be removed which creates a thread end. As previously mentioned, the cutter is usually "ramped out" of the thread form, meaning it is slowly removed leaving an inclined surface running from the root of the thread to the crest level or outer surface of the pipe end. When threaded connections such as this are subjected to high torques upon a connection make-up, threads of one member (pin) may slide up the inclined surface, or ramp, of the thread of the other member (box). This may result in radial separation of the two thread forms which may compromise the thread seal integrity as well as the structural integrity of the connection.

In accordance with embodiments of the present disclosure, by using a cutter with a substantially 90 degree milling head to cut the thread forms, a thread stop may be machined at the thread ends of the pin and box member of the connection. In machining the box thread stop, the milling procedure would differ slightly from normal, in that instead of continuing to rotate about the workpiece and gradually "run out" of the thread form, the cutter would stay at the thread root depth the entire time. Upon reaching the desired thread end, the cutter would come to a stop while still "in" the thread form. Alternatively, if the tubular workpiece is the member being rotated while cut, it would come to a stop as well. Further, alternatively, if both the cutter and the tubular workpiece are being rotated while the threads are cut, both would come to a stop simultaneously. The cutter may then be removed from the thread form, leaving the desired thread stop.

It should be understood that while a substantially 90 degree cutter is used in the above method of machining the thread stops, alternative cutter configurations may be used to achieve the varying thread stop configurations. For example, referring back to FIG. 6B, to achieve a positive thread stop configuration, a positive-shaped cutter which would leave such a configuration may be used, then retrieved from the thread form. The positive-shaped cutter may be configured with a slanted front cutting edge as opposed to a vertical front cutting edge. Alternatively, a substantially 90 degree cutter may be used by slowing the rotation when nearing the thread stop and then removing the cutter from the thread form, thereby leaving a steep inclined surface. Referring to FIG. 6C, to machine the negative thread stop a negative-shaped, or dovetailed, cutter may be used by rotating until reaching the thread stop, reversing rotation so as to withdraw from the thread stop, then removing the cutter from the thread form. One of ordinary skill in the art would appreciate that alternative means of machining different thread stop configurations may be achieved without diverting from the scope of the claims.

Additionally, in some threaded connections, a feature created by a "Higbee" tool may be used to mill a transition from a root diameter to a crest diameter at the beginning of a pin thread to help the pin threads start with corresponding box threads. However, instead of milling such a transition, an abrupt pin thread stop may be machined close to the pin nose. Engagement of the pin thread stop and the box thread stop may provide an additional anti-torque feature to the threaded connection along with the wedging effect of the thread forms. Furthermore, engagement of corresponding pin and box thread stops may help prevent unwanted radial separation of the threads of the pin and box members at selected make-up.

Additionally, thread stops disclosed in the present application may be used in combination with other features of threaded connections to effect a more "determinate" makeup where indeterminate makeup formerly existed. Further, thread stops as disclosed herein may be used in combination with standard, positive-stop, torque shoulders such that the torque stops only engage if the conventional positive-stop torque shoulder elastically deforms an amount considered to be excessive. Alternatively, the torque stops could be configured such that they only engage after conventional torque shoulders deform plastically and/or after the torque shoulders have yielded (i.e., become damaged).

Alternatively, thread stops as disclosed herein may be used in combination with threaded connections having differential wedge ratios or high-angle metal seals to make the make-up of such connections more "determinate" and predictable. Alternatively still, thread stops as disclosed herein may be used with conventional wedge-threaded connections such that the torque stops engage only at the point where the wedge threads plastically fail in torsion, or at a proportional limit of the thread surfaces. As such, a torque-turn curve for a conventional "run-out" thread may be produced up to the point of torsional yield of the threads. Thus the additional thread stop features could raise the torsional yield point of the connection, thus resulting in an extra torsional strength safety factor for the connection.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

I claim:

1. A threaded connection, comprising:
   a pin member comprising:
      an external wedge thread;
      a first pin thread stop positioned at a beginning of a pin thread of the external wedge thread of the pin member;
      a second pin thread stop positioned at a pin thread pull-out of the external wedge thread of the pin member; and
      a first sealing surface;
   a box member comprising:
      an internal wedge thread;
      a first box thread stop positioned at a box thread pull-out of the internal wedge thread on the box member;
      a second box thread stop positioned at a beginning of a box thread of the internal wedge thread of the box member; and
      a second sealing surface configured to correspond with the first sealing surface;
   wherein the first sealing surface and the second sealing surface are configured as high-angle metal-to-metal sealing surfaces, and
   wherein at least one of the first box thread stop or the second box thread stop has a negative configuration.

2. The threaded connection of claim 1, wherein the pin and box thread stops are configured to contact at a proportional limit of thread surfaces.

3. The threaded connection of claim 1, wherein the pin thread stop and the box thread stop are configured to prevent rotational movement between pin and box members.

4. The threaded connection of claim 1, further comprising:
   radial interference between the internal wedge thread and the external wedge thread;
   wherein the pin thread stop and the box thread stop are configured to contact and prevent radial expansion of the box member and radial contraction of the pin member at a selected make-up.

5. The threaded connection of claim 1, wherein the external wedge thread is a continuous external wedge thread and the internal wedge thread is a continuous internal wedge thread.

6. The threaded connection of claim 1, wherein a corresponding first pin thread stop or second pin thread stop has a negative configuration.

7. A threaded connection, comprising:
   a pin member comprising:
      a continuous external wedge thread having a pin root, a pin crest, a pin stab flank, and a pin load flank;
      a first pin thread stop positioned at a beginning of a pin thread of the external wedge thread of the pin member;
      a second pin thread stop positioned at a pin thread pull-out of the external wedge thread of the pin member; and
      a first sealing surface;
   a box member comprising:
      a continuous internal wedge thread having a box root, a box crest, a box stab flank, and a box load flank;
      a first box thread stop positioned at a box thread pull-out of the internal wedge thread on the box member;
      a second box thread stop positioned at a beginning of a box thread of the internal wedge thread of the box member; and
      a second sealing surface configured to correspond with the first sealing surface,
   wherein the pin and box roots contact the box and pin crests, respectively, before the pin and box stab flanks contact the box and pin load flanks, respectively, during make-up, and
   wherein at least one of the first pin thread stop or the second pin thread stop has a negative configuration.

8. The threaded connection of claim 7, wherein a corresponding first box thread stop or second box thread stop has a negative configuration.

9. A threaded connection, comprising:
   a pin member comprising:
      a continuous external wedge thread having a pin root, a pin crest, a pin stab flank, and a pin load flank;
      a first pin thread stop positioned at a beginning of a pin thread of the external wedge thread of the pin member;
      a second pin thread stop positioned at a pin thread pull-out of the external wedge thread of the pin member, wherein at least one of the first and second pin thread stops are configured to prevent over-torqueing the threaded connection; and
      a first sealing surface;
   a box member comprising:

a continuous internal wedge thread having a box root, a box crest, a box stab flank, and a box load flank;

a first box thread stop positioned at a box thread pull-out of the internal wedge thread on the box member;

a second box thread stop positioned at a beginning of a box thread of the internal wedge thread of the box member; and a second sealing surface configured to correspond with the first sealing surface, wherein the pin and box stab flanks contact the box and pin load flanks, respectively, before the pin and box roots contact the box and pin crests, respectively, during make-up, wherein at least one of the first box thread stop or the second box thread stop has a negative configuration, and wherein a corresponding first pin thread stop or second pin thread stop has a negative configuration.

\* \* \* \* \*